US005348061A

United States Patent [19]

Riley et al.

[11] Patent Number: 5,348,061

[45] Date of Patent: Sep. 20, 1994

[54] TABLET ACCUMULATOR FOR AN AUTOMATED PRESCRIPTION VIAL FILLING SYSTEM

[75] Inventors: Archie Riley, Athens, Ga.; Keith Goodale, Park City, Ill.

[73] Assignee: Baxter International Inc., Deerfield, Ill.

[21] Appl. No.: 984,048

[22] Filed: Dec. 1, 1992

[51] Int. Cl.$^5$ .................... G01G 19/00

[52] U.S. Cl. .................... 141/104; 141/98; 141/107; 141/83; 221/2; 221/129; 221/9; 221/133

[58] Field of Search .................... 221/2, 5, 9, 13, 129, 221/131, 133; 141/83, 102, 104, 105, 107, 98

[56] References Cited

U.S. PATENT DOCUMENTS

| | | | |
|---|---|---|---|
| 2,665,775 | 1/1954 | Smith . | |
| 2,708,996 | 5/1955 | Skillman . | |
| 2,865,532 | 12/1955 | Smith . | |
| 3,023,851 | 3/1962 | Stiller . | |
| 3,144,958 | 8/1964 | Gumpertz . | |
| 3,160,793 | 12/1964 | Colburn et al. . | |
| 3,179,288 | 4/1965 | Davy . | |
| 3,185,851 | 5/1965 | D'Emilio . | |
| 3,196,276 | 7/1965 | Naab . | |
| 3,206,062 | 9/1965 | Rappaport . | |
| 3,310,199 | 3/1967 | Roberts et al. . | |
| 3,312,372 | 4/1967 | Cooper, Jr. . | |
| 3,410,450 | 11/1968 | Fortenberry . | |
| 3,417,542 | 12/1968 | Merrill et al. . | |
| 3,436,736 | 4/1969 | Platt et al. . | |
| 3,556,342 | 1/1971 | Guarr . | |
| 3,599,152 | 8/1971 | Williams . | |
| 3,730,388 | 5/1973 | Bender . | |
| 3,732,544 | 5/1973 | Obland . | |
| 3,780,907 | 12/1973 | Colburn et al. . | |
| 3,815,780 | 6/1974 | Bauer . | |
| 3,837,139 | 9/1974 | Roseberg . | |
| 3,917,045 | 11/1975 | Williams et al. . | |
| 4,266,691 | 5/1981 | Wolwowicz | 141/83 X |
| 4,267,942 | 5/1981 | Wick, Jr. et al. . | |
| 4,434,602 | 3/1984 | Culpepper . | |
| 4,501,339 | 2/1985 | Fukuda | 141/102 X |
| 4,537,229 | 8/1985 | Sashiki et al. | 141/83 |
| 4,546,901 | 10/1985 | Buttarazzi . | |
| 4,559,981 | 12/1985 | Hirano | 141/83 |
| 4,573,606 | 3/1986 | Lewis et al. . | |
| 4,621,644 | 11/1986 | Pryor et al. | 141/1 |
| 4,655,026 | 4/1987 | Wigoda . | |
| 4,664,289 | 5/1987 | Shimizu et al. . | |
| 4,674,259 | 6/1987 | Hills . | |
| 4,674,651 | 6/1987 | Scidmore et al. . | |
| 4,693,057 | 9/1987 | Rittinger et al. . | |
| 4,695,954 | 9/1987 | Rose et al. . | |
| 4,756,348 | 7/1988 | Moller | 141/83 |
| 4,766,542 | 8/1988 | Pilarczyk . | |
| 4,767,023 | 8/1988 | Hackmann et al. . | |
| 4,811,764 | 3/1989 | McLaughlin | 141/98 |
| 4,869,392 | 9/1989 | Moulding, Jr. et al. . | |
| 4,918,604 | 4/1990 | Baum . | |
| 4,980,292 | 12/1990 | Elbert et al. . | |
| 4,984,709 | 1/1991 | Weinstein . | |
| 5,018,644 | 5/1991 | Hackmann et al. . | |
| 5,047,948 | 9/1991 | Turner . | |
| 5,092,490 | 3/1992 | Suzuki et al. | 141/83 X |

FOREIGN PATENT DOCUMENTS

| | | | |
|---|---|---|---|
| 936501 | 11/1973 | Canada . | |
| 5247400 | 5/1975 | Japan . | |
| 3294307 | 12/1988 | Japan | 221/2 |
| 1168758 | 10/1969 | United Kingdom . | |
| 1411951 | 10/1970 | United Kingdom . | |

*Primary Examiner*—Ernest G. Cusick

*Attorney, Agent, or Firm*—Paul E. Schaafsma; Paul C. Flattery

[57] ABSTRACT

A method and system for staging drugs dispensed from a drug dispensing apparatus including an accumulator operative to temporarily accumulate drugs for later dispensing into vials. The accumulator includes one or more staging containers positioned to receive dispensed drugs that fall freely under the influence of gravity, each container having an outlet that is selectively openable so that the drugs retained therein can be delivered to a vial at a later time. Several orders can be staged in parallel if several such staging containers are provided. The drugs are staged in the accumulators for dispensing before vials are positioned so that dispensing of all the drugs for each vial may be performed simultaneously.

7 Claims, 9 Drawing Sheets

TABLET ACCUMULATOR FOR AN AUTOMATED PRESCRIPTION VIAL FILLING SYSTEM

BACKGROUND OF THE INVENTION

The present invention generally relates to methods and apparatus for dispensing prescriptions. More specifically, the invention relates to methods and apparatus for staging medications for dispensing and filling containers, such as vials.

Generally, out-patients from a hospital or medical office have been provided with prescriptions in one of two ways. One way is to provide oral, solid prescriptions that are prefilled in vials at a remote location and kept in inventory at a pharmacy. These prefilled vials are removed from stock when needed and relabelled with patient specific information. Another method involves filling prescriptions by having a pharmacist hand-count the required drugs from a bulk supply and then place a patient specific label on a vial.

There are disadvantages to both of these prescriptions filling methods. If pharmacists elect to use prefilled vials, they must carry an inventory of several hundred drug types. Further, they must manage inventory levels and monitor stock for expiring products. Generally, a pharmacist will pay a premium for having the vials prefilled.

On the other hand, filling prescriptions from bulk on an individual basis is very labor intensive and subject to human accounting errors. Further, servicing a large out-patient population requires large numbers of pharmacists.

Many out-patient facilities use a combination of these two systems, supplying prefilled vials on high volume products and hand-filling vials with products that are less in demand.

A method of direct dispensing drugs into a vial is used in some operations. Direct dispensing is a process wherein tablets are dispensed one at a time and counted during each dispensing stroke. The counting stroke accounts for a high accuracy rate but significantly reduces the speed of drug delivery.

Often, a single order may require the dispensing of as many as 200 different drugs to fill the order. However, individual canisters only store a single drug. Therefore, if 200 different drugs are required to fill an order, the vial must be re-positioned 200 separate instances to fill an individual order. This method of repositioning and dispensing is known as serial processing.

Serial processing can be a very accurate method of dispensing drugs to fill a prescription. Using serial processing, the drugs can be either counted by a machine referred to as an "automatic tablet counter" or by hand. The individual drugs are simultaneously dispensed into a vial and counted. While this method can be very accurate, it also can be quite time-consuming.

Additionally, after all of the drugs for an order have been dispensed into vials, the vials are capped and labeled. Each vial generally contains one drug. Different labels are, therefore, required for identifying the contents of the vials as well as special instructions for taking the drugs by the patient. The vials are then sorted so that all vials for one order are grouped together.

SUMMARY OF THE INVENTION

The present invention provides an improved method and apparatus for staging patient orders prior to vial filling. The invention provides for multiple staging of orders in advance of the actual vial-filling process, yet maintains the accuracy of direct dispensing. To these ends, the invention provides for parallel processing of orders within a vial filling machine with serial dispensing therefrom.

In an embodiment, the invention provides an apparatus that allows for single or multiple staging of patient orders in a tablet counter using a tablet accumulator. The tablet accumulator includes a housing and a solenoid actuated shutter assembly for dispensing drugs from the housing to a positioned vial. The tablet accumulator can be provided at the output of an automatic tablet counter as a temporary storage area, i.e. a staging area, for each drug being dispensed from the tablet counter.

In an embodiment, the tablet accumulator includes a plurality of storage or staging areas. Multiple staging of patient orders can, therefore, be provided, and the accuracy of direction dispensing from the tablet counters can be maintained. The speed of dispensing the tablets, however, can be significantly increased.

In an embodiment, the invention provides a system to input a patient order via a computer terminal. The order includes prescription and patient identification information. The system can process the information and begin counting one or more drugs in parallel into staging areas of a tablet accumulator for dispensing while, at the same time, vials can be positioned to receive the drugs in serial fashion. In this way, more than one vial order can be filled substantially simultaneously.

Additional features and advantages of the present invention are described in, and will be apparent from, the following detailed description of the presently preferred embodiments and from the drawings.

DETAILED DESCRIPTION OF THE PRESENTLY PREFERRED EMBODIMENTS

Pursuant to the present invention, a system can be provided for dispensing prescription drugs wherein the system packages an order for one or more prescriptions in view of patient prescription information and then presents a complete patient's order to a pharmacist for pick-up or delivery.

Figure 1:
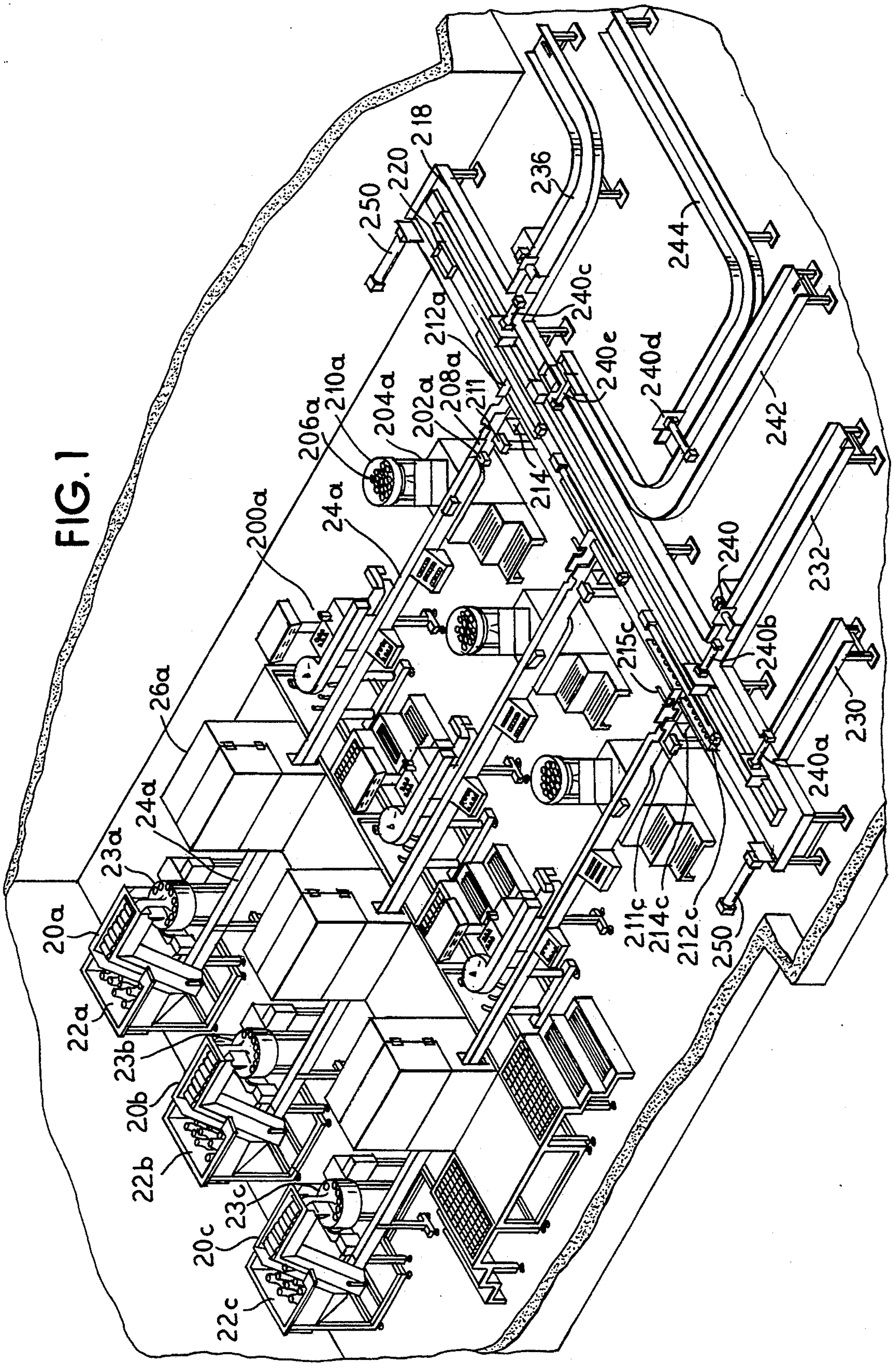
FIG. 1 illustrates an automated prescription vial filling system.
Figure 2:
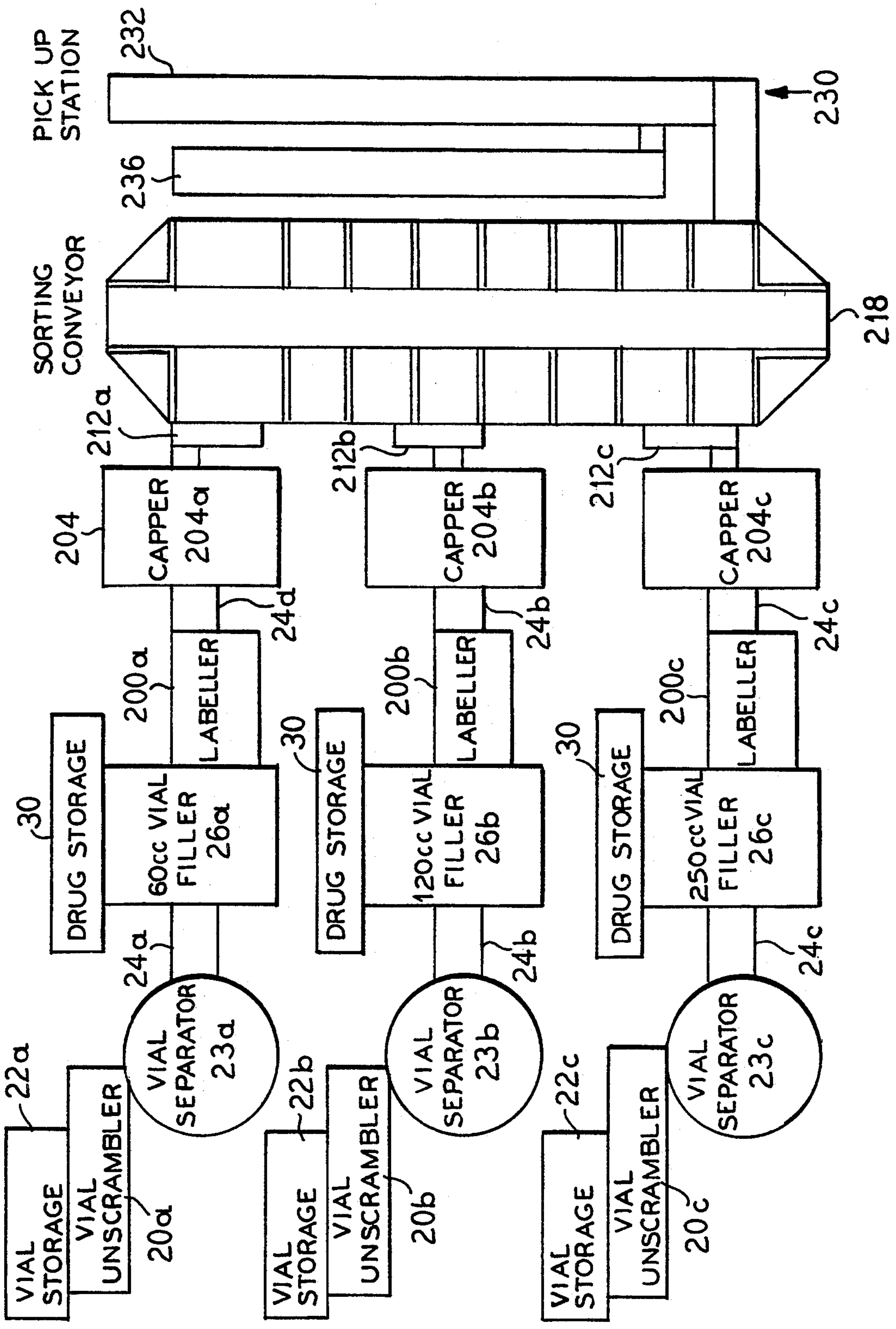
FIG. 2 illustrates a schematic for the system of FIG. 1.

Such a system is illustrated in FIGS. 1 and 2. The details of a system in which the invention can be incorporated are set forth in commonly assigned U.S. Pat. No. 5,208,762 issued May 4, 1993, the disclosure of which is fully incorporated herein by reference.

Briefly, system 10, as shown in FIGS. 1 and 2, includes three lines 12, 14 and 16 of machines that automatically fill, label, cap, and sort vials 18 in accordance with a patient's prescription order under the control of an appropriate control system. Preferably, the three lines 12, 14 and 16 are identical with the exception of the vial sizes filled. While vial sizes will be determined by prescription quantity, drug mix, and drug volume of an institution in which the system 10 is used, a typical vial size distribution would be 60 cc, 120 cc, and 250 cc. While only three lines 12, 14 and 16 are shown in FIGS. 1 and 2, it can be appreciated that yet more filler lines can be provided to obtain parallel processing.

For ease of understanding, only one of the lines 12, 14, and 16 will be described herein. However, it should be apparent that, with the exception of vial size, the description is applicable to each of the lines 12, 14, and 16. Therefore, reference numerals identifying items in the drawings which have counterparts associated with each line will be used generically in this description, but in the drawings will carry additional designations such as a, b, and c to identify those items corresponding to the particular lines.

The first machine positioned in each line of the system is a vial unscrambler 20. In such a machine, vials of one size are dumped into a hopper 22 in bulk form. The hopper 22 preferably is large enough to hold approximately 1100 vials, about a day's supply.

The unscrambler 20 orients the vials upright in a separator 23 and spaces them on a conveyor 24 ready to feed the vials into a vial filler 26. The unscrambler 20 also shoots a blast of hot air into the vial, cleaning debris that might be present. Preferably, the unscrambler 20 comprises a machine similar to an Omega Model CR or a New England Machinery Model NEHE-50J or NEHB-50AJ.

From the unscrambler 20, a vial will travel via the conveyor 24 to the vial filler 26 (also referred to as the filler). The vial filler 26 preferably comprises in part a modified automatic tablet counter machine sold by Baxter International, Inc. under the design "ATC 212" machine, or Automatic Tablet Counter, which is capable of holding up to 212 different oral, solid medications. The canisters can be calibrated specifically for those drugs stored therein. There can be one or more ATC machines per line depending on drug mix and drug volume required by the institution in which the system 10 is installed.

Figure 3:
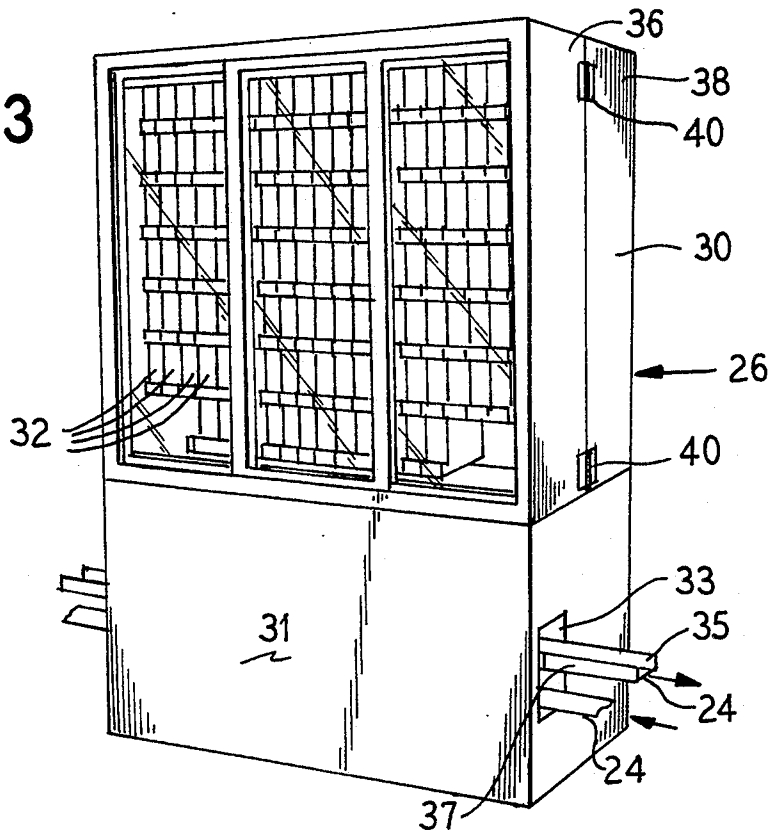
FIG. 3 illustrates a perspective view of a tablet counter/vial filler in which an accumulator is provided.
Figure 4:
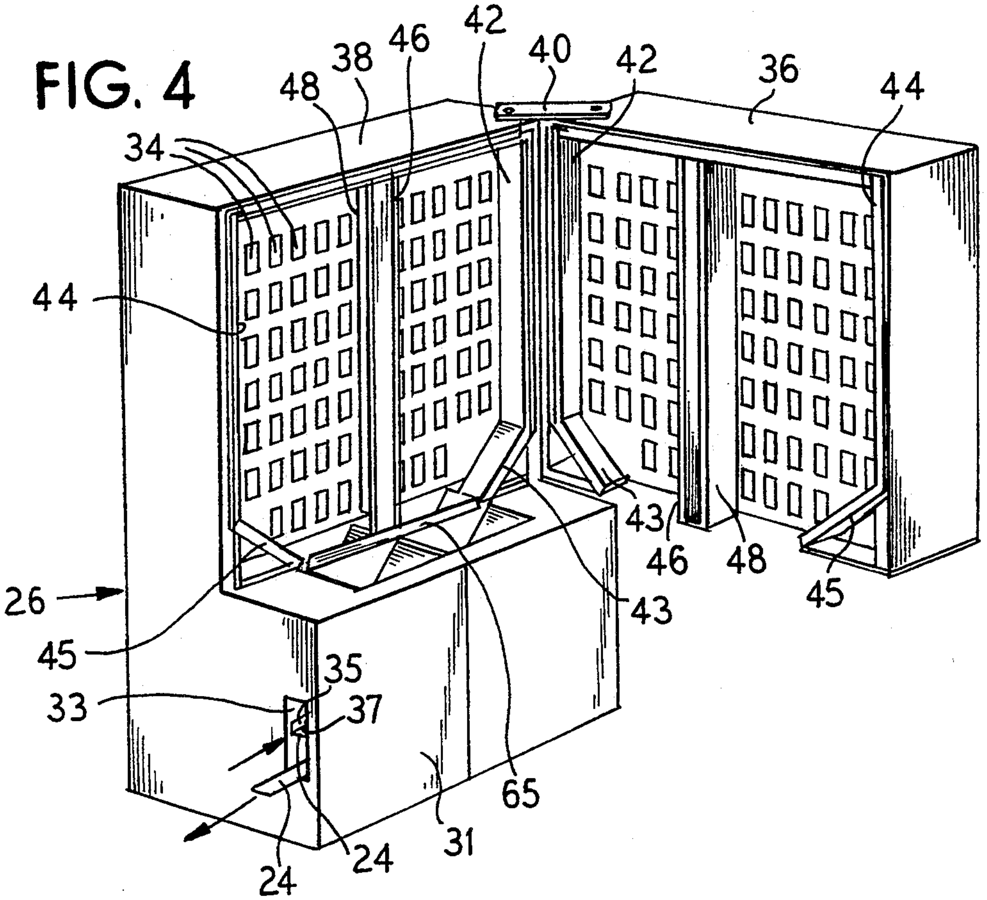
FIG. 4 illustrates in perspective view an interior of the tablet counter/vial filler of FIG. 3.

In FIGS. 3 and 4, a preferred vial filler 26 is illustrated in greater detail. As illustrated, the filler 26 includes a drug cabinet or upper enclosure 30 wherein are stored a plurality of drug canisters or tablet cases 32 such as those presently employed in the standard 212 systems sold by Baxter International, Inc. These canisters 32 are positioned to dispense drugs or tablets out of a dispensing end 34 (see FIG. 4) positioned interiorly of the enclosure 30. The operation of such canisters 32 is known from the operation of Baxter's ATC 212 system and therefore is not repeated herein in detail.

The vial filler 26 also includes a lower cabinet 31 having a suitable opening 33 extending therethrough through which passes the conveyor 24. To ensure that the vials 18 remain in an upright position while traveling through the vial filler 26, a pair of rails 35 and 37 are positioned on opposite sides of the conveyor 24. The rails 35 and 37 confine the vials 18 to the conveyor 24.

As illustrated best in FIG. 4, it can be seen that, preferably, filler 26 has been configured to include two drug cabinet halves 36 and 38 hingedly connected on one end by hinges 40 so that they can be closed together to form the drug cabinet or upper enclosure 30. Within each half 36 or 38 are stored an array or matrix of drug canisters 32. Thus, the back or dispensing ends 34 of two arrays of drug canisters 32 will face each other within the interior of the cabinet.

As also illustrated in FIG. 4, each of the halves 36 and 38 of the cabinet 30 is provided with various vertical channel members. These vertical channel members include channel members 42 and 44 disposed on opposite ends of each of the halves 36 and 38 of the enclosure 30 as well as two channel members 46 and 48 which are positioned back-to-back along a midline of each of the halves 36 and 38 of the cabinet 30. It can be appreciated that when the two cabinet halves 36 and 38 are closed, the various like channel members will align in registry.

Attached at bottom ends of the channel members 42 and 44 are extensions 43 and 45, respectively, which are disposed at an obtuse angle relative to their respective channel members 42 and 44. It can be appreciated that while the channel members 42 and 44 provide vertical channeling within the upper enclosure 30, the channel extensions 43 and 45 provided channeling toward a point short of the midline, thus leaving an opening between the channel members 46 and 48 and the extensions 43 and 45 at the bottom of the cabinet 30.

Figure 5:
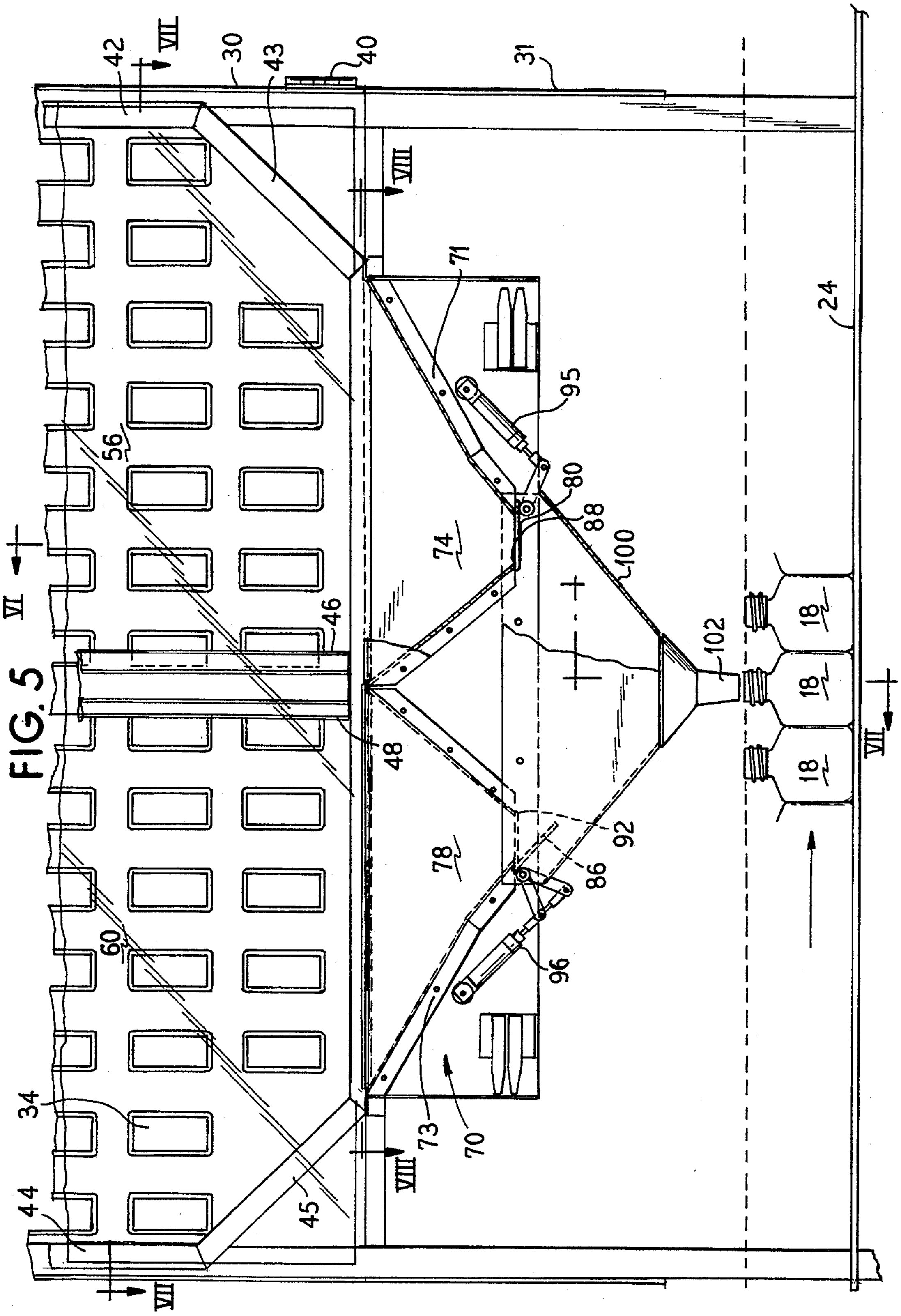
FIG. 5 illustrates an isometric view of the interior of the tablet counter/vial filler of FIG. 3.
Figure 6:
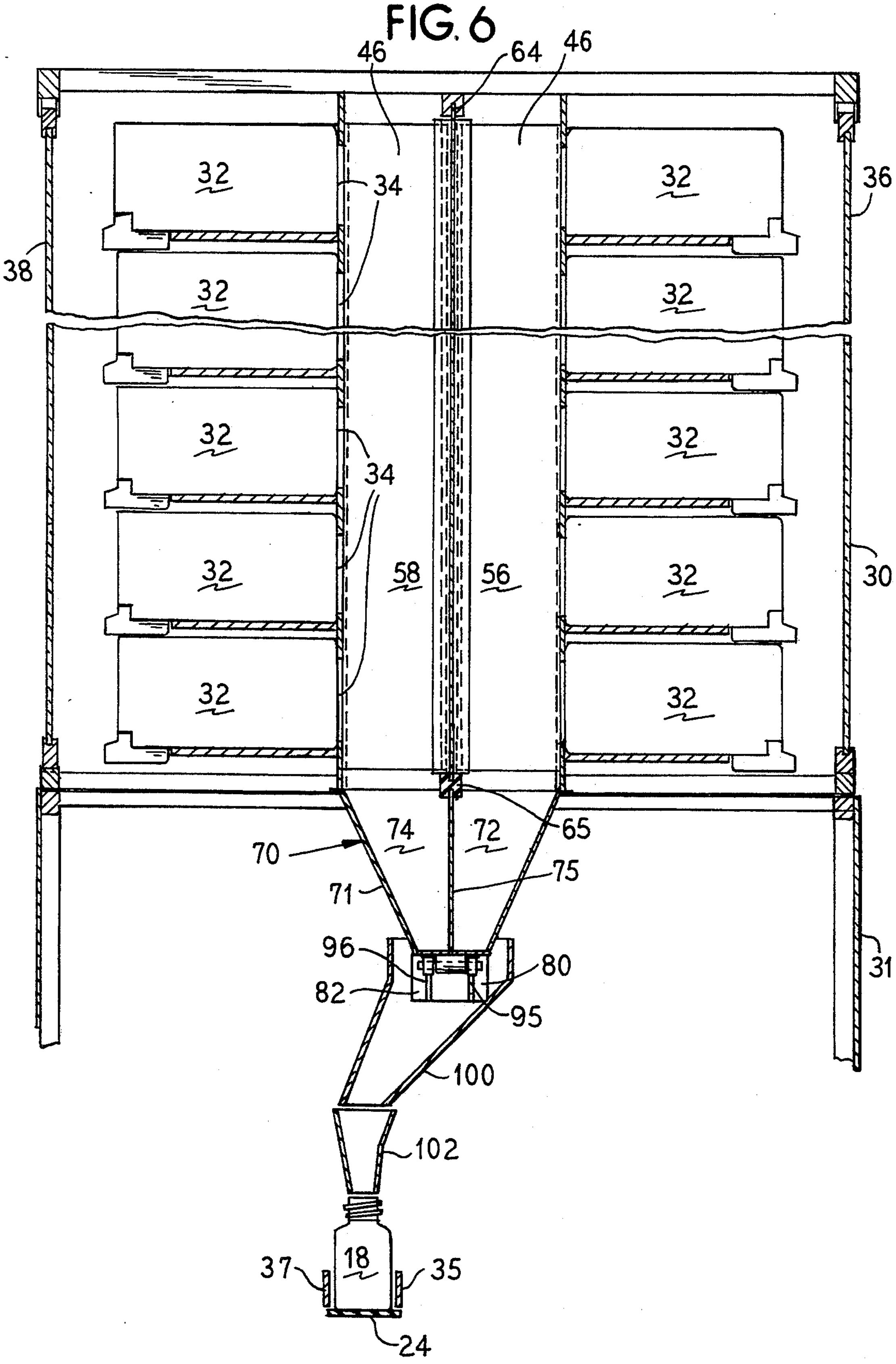
FIG. 6 illustrates a cross-sectional view of the tablet counter/vial filler of FIG. 5 taken generally along the line VI—VI.
Figure 7:
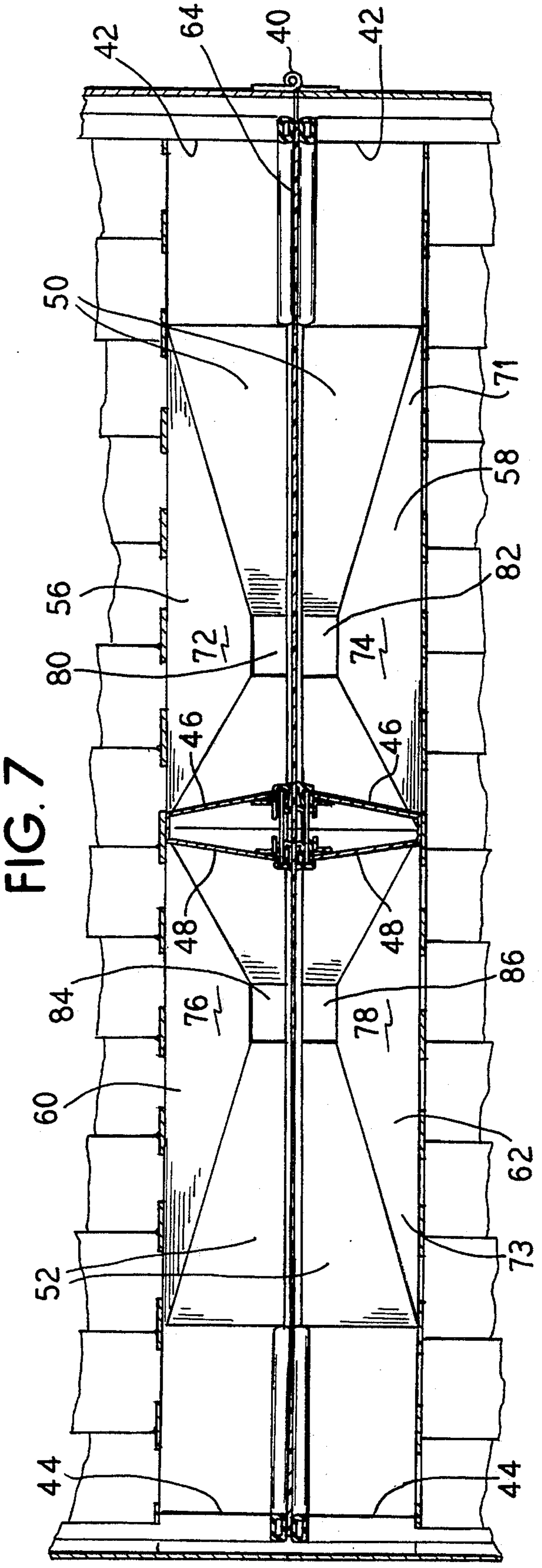
FIG. 7 illustrates a cross-sectional view of the tablet counter/vial filler of FIG. 5 taken generally along the line VII—VII.

With reference to all of FIGS. 4, 5, 6, and 7, it can be appreciated that when the two halves 36 and 38 of the enclosure 30 are shut, the various channel members abut to form at least two separated enclosed spaces 50 and 52 within the cabinet or upper enclosure 30. In a preferred embodiment, these spaces 50 and 52 are further subdivided into sub-spaces 56, 58, 60, and 62 by means of a curtain 64 that extends between the two closed enclosure halves 36 and 38 as illustrated in FIGS. 6 and 7. The curtain 64 preferably is suspended from the top of one of the halves 36 or 38 (in the illustrated embodiment, the curtain 64 is hung from the top of the half 38), and then grasped between the abutting channel members when the halves 36 and 38 are shut. The abutting channel members thus serve to seal about an outer periphery of the curtain 64 within the cabinet 30.

The curtain 64 serves to isolate the facing back ends 34 of the arrays or matrices of canisters 32. As a result, drugs from one array or matrix can be dispensed and allowed to free fall within its associated space 50 or 52 without intermixing or intermingling with drugs dispensed from a canister 32 from the facing array.

It can be appreciated that from the foregoing, that each of the four sub-spaces 56, 58, 60 and 62 is in open communication with the dispensing ends 34 of a particular sub-array of drug canisters 32. Accordingly, actuation of a drug canister 32 within a sub-space 56, 58, 60 or 62 will cause the drugs contained in that canister to free fall within that sub-space. The channel members located on either side of the sub-space will serve to contain the free falling drugs within the sub-space and to direct same to the bottom of the sub-space.

In a preferred embodiment of the vial filler 26, disposed beneath the cabinet 30 and in communication with the four sub-spaces is a funneling device referred to herein as an accumulator 70. The accumulator 70 is positioned between the four sub-spaces 56, 58, 60 and 62 and the conveyor 24.

As illustrated in FIGS. 5, 6, 7 and 8, the accumulator 70 includes two funnel shaped members 71 and 73 that include interior upstanding walls 75 and 77, respectively, so to form sub-sections 72, 74, 76 and 78, each sub-section associated with one of the open subspaces 56, 58, 60 and 62, respectively of the cabinet 30.

It should be appreciated that the free falling drugs in one of the open sub-spaces 56, 58, 60 or 62 will be directed or channelled into its associated sub-section 72, 74, 76 and 78 by means of gravity and the associated channel members. These sub-sections 72, 74, 76 and 78 of the accumulator 70 form the temporary storage areas or staging areas that serve to provide the vial filler 26 with a dispensing speed that is faster than that of an unmodified ATC 212. As such, the staging areas 72, 74, 76 and 78 serves as means for temporarily storing or staging of dispensed drugs prior to vial filling.

Figure 8:
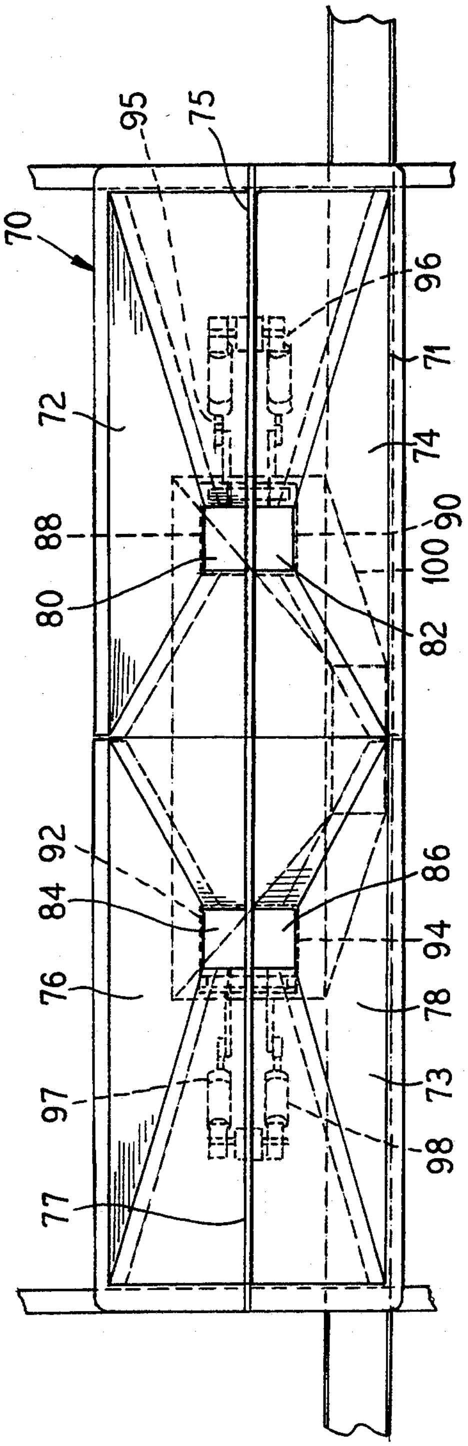
FIG. 8 illustrates a cross-sectional view of the tablet counter/vial filler of FIG. 5 taken generally alone the line VIII—VIII.

As illustrated best in FIGS. 5, 6 and 8, disposed at a bottom end of each of the accumulator sub-sections or staging areas 72, 74, 76 and 78, is a respective shutter 80, 82, 84 or 86, that serves to close a respective opening 88, 90, 92 or 94 disposed at the bottom of the funneling section. As illustrated, the shutter 80, 82, 84 or 86 is hingedly connected so that it can open and close the opening 88, 90, 92 or 94 thereby allowing drugs captured within the respective staging sub-section 72, 74, 76 or 78 to free fall out of that funneling sub-section. As such, these shutters 80, 82, 84 and 86 serve as means for releasing staged or temporarily stored drugs from the accumulator to a vial to be filled.

As illustrated, each of the shutters 80, 82, 84 and 86 is actuated by means of a suitable solenoid and piston assembly 95, 96, 97 or 98, respectively, operatively coupled thereto. As is known, the solenoid and piston assembly comprise a spring loaded piston which can be caused to move upon energization of a solenoid. Energization of the solenoid of an assembly 95, 96, 97 or 98 will cause the piston associated therewith to move and then pull the respective shutter 80, 82, 84 or 86 open thereby opening the opening in the bottom of the accumulator staging sub-section associated therewith. As such, the solenoid assemblies comprise means for causing the shutters to release drugs staged for dispensing. Of course, actuation of these shutters 80, 82, 84 and 86 can be controlled by a suitable controller such as the computer that operates the overall vial filling system 10.

As illustrated in FIGS. 5 and 6, disposed beneath the bottom end of the accumulator staging sub-sections 72, 74, 76 and 78 is a further funneling member 100 that serves to direct drugs falling from the sub-sections of the accumulator 70 into a bottle or vial filling member 102. It can be appreciated that as vials 18 are directed into the vial filler 26, and positioned beneath the vial filling member 102, drugs or tablets allowed to free fall from the accumulator 70 by means of actuation of one of the shutters 80, 82, 84 and 86, will be directed by the funneling member 100 into the vial filling member 102 and thence into the vial positioned for filling.

It can also be appreciated that because there are four accumulator staging sub-sections disposed beneath the cabinet 30, these four staging sub-sections can be filled in parallel and dumped in parallel or serially into one or more vials 18 as the vials pass beneath the vial filling member 102. In this manner, up to four prescriptions can be filled by one vial filler 26 substantially in parallel, this parallel processing of prescriptions allows for a more efficient use of a vial filler 26 and faster processing of prescriptions.

Because tablet collection can occur in a parallel fashion with other patient orders in the system 10, up to sixteen canister locations can be filled simultaneously (i.e., four accumulator staging sub-sections for each of four lines). The process of filling certain drugs can thus be performed more rapidly by using duplicate drug locations in the vial filler 26.

The tablet accumulators allow for tablet dispensing without dependence on printing, conveyor feed, and conveyor exit times. A tablet accumulator, therefore, allows for orders to be staged in advance of the actual vial-filling process. Multiple patient orders can be processed and dispensed into their tablet accumulator at any time in the overall process with each vial then being sequentially filled at the appropriate later time by the dumping action of the tablet accumulators.

Collection volume of the tablet accumulator 70 can be optimized by placing the associated solenoid assemblies outside of the sub-sections as illustrated. In addition to the overall system managing computer, or alternatively, each solenoid assembly can be activated by a driver board or controller provided as part of the hardware of the associated vial filler 26.

In operation, once an order is received, the orders can be dispensed into their respective staging areas or the tablet accumulators 70 before positioning of a vial. A control system 180 (illustrated schematically in FIG. 9) activates the appropriate drug canister 32 and dispensing of the drugs begins immediately. Once the drugs are dispensed into their staging area of their tablet accumulator 70, a vial 18 will be positioned, and the drugs can then be dispensed. Throughput can be improved by staging of fills before the vial is under a filling position of the vial filling member 102 as positioned by conveyor 24.

The remainder of the system 10 illustrated in FIGS. 1 and 2 is similar to that described in the commonly assigned U.S. Pat. No. 5,208,762 identified above. That part of the system is briefly described herein as are the prescription fill and prescription sort flow diagrams of FIGS. 10 and 11.

After filling, the vial 18 travels to a label machine 200 (also referred to as the labeller), preferably a Willett Model 2500 with a Model 2600-T thermal transfer printer/applicator, manufactured by Kalamazoo Label Company. A signal from the control system 180 is sent to the label machine 200 at the same time the vial 18 is being filled. The label machine 200 prints human readable information, as well as bar code information on demand. The label information is kept in a database and contains drug description, as well as any warning statements.

After the label is printed, a reader associated with the label machine 200 verifies the contents of the label by reading the printed bar code. The label is then automatically applied to the vial.

Once a vial is filled and labelled, it travels down the conveyor 24 to a capping machine 204 (also referred to as the capper). The capping machine 204 grasps the vial and applies a child-resistant cap 206 to the vial.

As illustrated, just prior to the capper 204, each line includes a bar code reader 202 and a wrap belt 208 disposed on opposite sides of the conveyor 24. The wrap belt 208 serves to spin a vial around so that the bar code thereon can be read by the reader 202.

After the vial is capped, a sensor associated therewith verifies that the cap has been properly applied. The capper 204 preferably includes a reservoir 210 that is sufficiently large to store a supply of caps for one full shift. The preferred capping machine is one similar to National Instrument Company's Capamatic DLR-I or a Kalish-CAP Automatic.

Once a vial has been capped and the contents are verified by the sensor 211, it proceeds to a vial accumulator or vial accumulation station 212 positioned at the end of its respective conveyor 24 (vial accumulator 212C is illustrated most clearly in FIG. 1). The vial accumulation station 212 serves two functions: sorting and ejecting. Vials are ejected when they have an improper drug count, unreadable labels, or improperly seated caps. A signal sent by the filler 26, label machine 200, or capper 204 causes a defective vial to be ejected into a reject bin 214 by a blast of air from a pneumatic air gun 215 if any of the situations is detected. When a vial is ejected, the control system 180 places a refill request with the filler 26 on a priority basis so that another attempt is made to complete the prescription order.

A circulating conveyor 218 (also referred to as a sorting conveyor) carries circulating bins 220 along an elliptical path that brings each of the bins under the vial accumulator 212 once per rotation. The bins 220 are bar coded and the control system 180 assigns at least one circulating bin 220 per patient. If a particular patient has more vials than a single bin can hold, a second or third bin will also be assigned. A bin 220 will circulate on the conveyor 218 until a total order has been collected for a given patient. The bar code on the bin 220 will be read prior to travel under the vial accumulators 212. This will signal the correct time for the vial accumulator 212 to discharge a specific vial of a patient into the bin 220.

All properly bottled vials are assigned to a patient on the vial accumulator 212 where they await a circulating bin 220 in which they are to be placed. These locations are also referred to as the staging output area. The vial accumulator 212 preferably has up to twenty locations for temporary vial storage.

The vial accumulators 212 are positioned above the conveyor 218 so that the vials waiting on the vial accumulator 212 can be placed into a passing bin 220. To this end, each vial accumulator 212 has associated therewith a pneumatic gripper 37 on a rodless cylinder for placing upon command, a vial into a bin 220.

One or more of the bins 220 is assigned to a patient by a control system 180. As the assigned circulating bin(s) 220 move(s) under the vial accumulator 212, the vial accumulator 212 transfers the vials into the assigned bin(s) 220. Preferably, the vial accumulator 212 is capable of placing its entire contents in one bin if necessary, i.e. the back bin preferably is capable of holding twenty vials. In this manner, all of the vials for one order of a patient can be sorted and placed together in a bin.

When a total order of a patient has been accumulated in one or more bins 220, the sorting conveyor 218 transfers the bins 220 to one of a plurality of spurs.

Spur 230 is a conveyor referred to as the exception conveyor. An order is placed on spur 230 if, for some reason, it is not designated for mail order or pick-up. The spur 230 can be used to place medications other than oral solids into a bin 220 of a patient. This spur 230 can carry a bin 220 under a rack that contains, for example, liquids or creams. By reading the bar code on the bin 220, the rack automatically discharges the correct medication into the bin 220.

Spur 232 is a conveyor referred to as the mail order conveyor. An order is placed on the spur 232 if it is to be mailed to a patient.

Spur 236 is a conveyor referred to as the pick-up conveyor. An order is placed on the spur 236 if it is to be picked up by a patient, e.g. a walk-in.

As illustrated, a variety of extractors 240 are operatively positioned to move bins onto and off of the conveyors 218, 230, 232, 236, 242 and 244. These extractors are generally designated by the numeral 240. Extractor **240*a*, upon command, diverts bins from conveyor 218 onto conveyor 230. Extractor 240*b*, upon command, diverts bins from conveyor 218 onto conveyor 232. Extractor 240*c*, upon command, diverts bins from conveyor 218 onto conveyor 232. Extractor 240*d*, upon command, diverts returned bins from conveyor 244 onto conveyor 60. Extractor 240*e*, upon command, diverts return bins from a conveyor 242 onto conveyor 218. Additionally, a scanner 248** is provided that reads bar codes on returned bins.

An empty bin is placed on return conveyor 242 or 244 which places it back on the circulating conveyor 218. The return conveyor 242 is used to return bins used for mail orders, while the return conveyor 244 is used to return bins used for pick-up orders. At the point of return, the bar code on the bin 220 will be read and noted in the control system 180 as an available bin. If the bar code is unreadable, the bin 220 is automatically ejected from the system 10. The return is located just downstream of the take-off on the circulating bin conveyor 218 so the circulating conveyor 218 will always be full.

Overhead transfer cylinders 250 are used to transfer bins 220 from one straight conveyor **218*a* to another straight conveyor 218*b*, which together form the circulating conveyor 218**.

Figure 9:
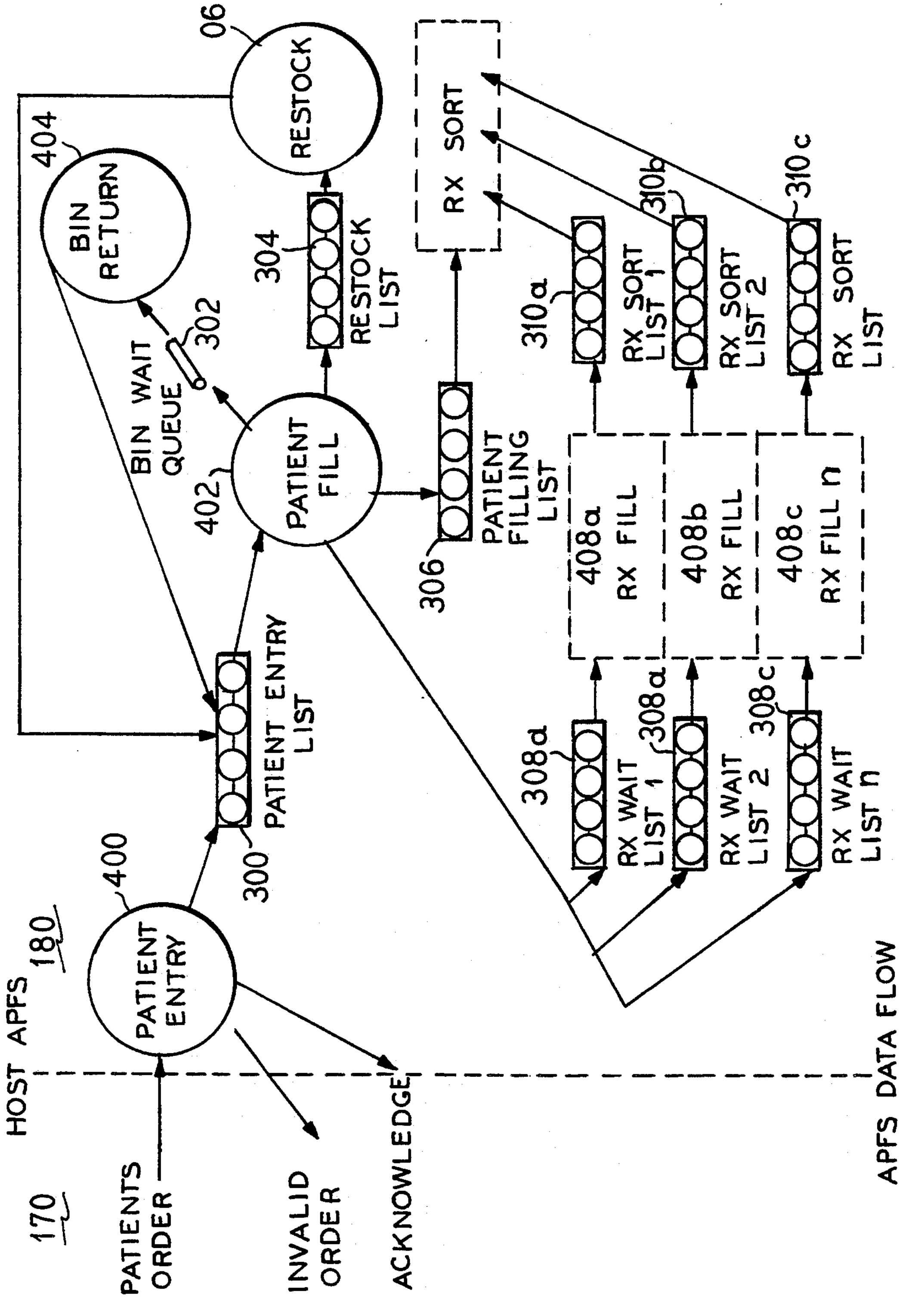
FIG. 9 illustrates a data flow diagram for the system of FIGS. 1 and 2.
Figure 10:
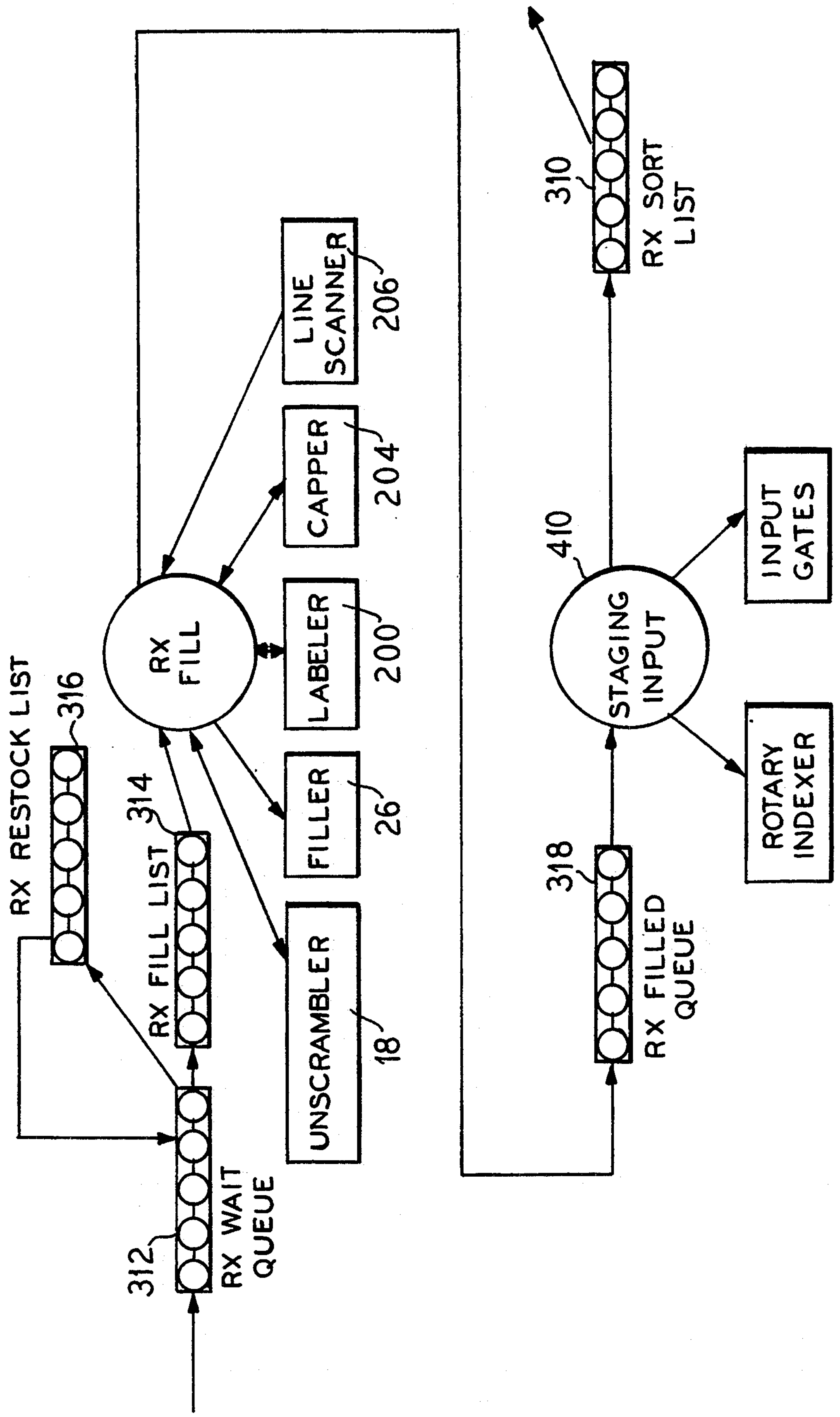
FIG. 10 illustrates a prescription fill flow diagram for the system of FIGS. 1 and 2.
Figure 11:
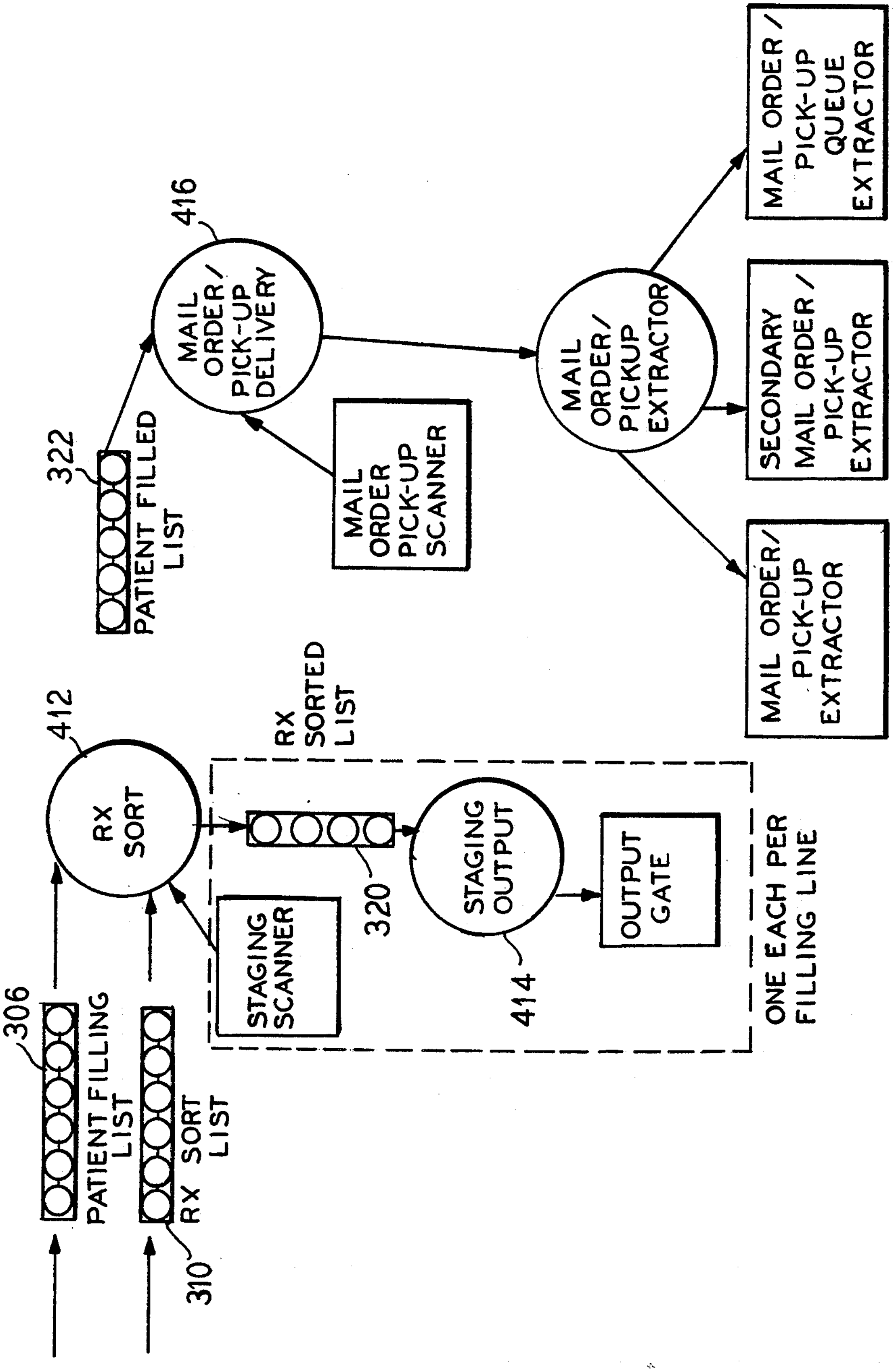
FIG. 11 illustrates a prescription sort data flow diagram for the system of FIGS. 1 and 2.

In FIGS. 9–11, the data flow for various aspects of the system 10 is illustrated. As illustrated in FIG. 9, a host computer 170 provides order information of a patient to a control system 180. In return, the control system 180 advises the host computer 170 as to whether an order is valid or invalid.

In the data flow diagrams, several items such as data units, smart boxes, registers, etc. are identified. These are discussed first.

The Patient Entry List 300 is a collection of patient orders received by the control system 180 via the host computer 170. Generally, the orders are organized in a first-in, first-out (FIFO) manner. However, when orders receive priority status, e.g. during a refill as described above, a latter order can be placed at the head of the list so that it will be processed first. Each entry on the Patient Entry List 300 includes patient specific information, for identification purposes, and one or more prescriptions for a patient.

The Bin Wait Queue 302 is used to temporarily hold an order of a patient pending availability of one of the circulating bins 220. This is a FIFO queue and when a bin 220 becomes available, the order held the longest is assigned to that bin 220. The Re-Fill List 304 is a FIFO list used whenever a drug canister 32 does not contain a sufficient quantity to fill an order of a patient. When such is the case, the unfilled order is removed from the Patient Entry List 300 and placed at the end of the Re-Fill List until the designated canister 32 is filled.

The Patient Filling List 306 is a FIFO List used once it has been designated that an order can be filled by the system 10. Once such a determination is made, an order of a patient is transferred from the Patient Entry List 300 and placed at the end of the Patient Filling List 306.

The Prescription Wait Lists 308 are FIFO lists that are used once it has been determined that an order of a patient can be filled. For every filling line 12, 14 and 16 in the system 10, there is a dedicated Prescription Wait List 308. When such a determination is made, a prescription and an order of a patient is placed at the tail end of the appropriate Prescription Wait List 308. The prescriptions are removed from a Prescription Wait List 308 in the order received.

The Prescription Sort Lists 310 are randomly accessible lists used once prescriptions have been filled. One Prescription Sort List 310 is provided for each of the lines 12, 14, and 16. Once a prescription is filled, the prescription is placed at the end of its respective Prescription Sort List 310. At that time, the associated vial will be sitting in the vial accumulator 212.

The Prescription Sort Lists 310 are used by the control system 180, as discussed below, to place vials in the staging area into the correct bin 220.

Prescriptions are randomly removed from these lists as they are placed into their bins 220.

The Prescription Wait Queue 312 are generally FIFO lists containing listings of prescriptions to be filled by the vial filler 26. One Prescription Wait Queue 312 is provided for each vial filler 26. When a prescription is assigned to a line for filling, it is transferred from its associated Prescription Wait List 308 to this list.

The Prescription Fill Lists 314 are used when vials are to be filled. One Prescription Fill List 314 is produced for each filler 26. At that time, the tablet canisters 32 begin dispensing tablets into their individual staging areas 72, 74, 76 or 78 of their tablet accumulator 70. This process is occurring while the vials are being positioned on the filling line. As a result, the counting of tablets has already been performed before the vial is positioned, and all that is required is solenoid actuation of the appropriate trap door shutter to release the tablets from their individual accumulator staging subsection to the vials. After a prescription is filled and left waiting to enter the vial accumulation station 212, it is removed from this list.

The Prescription Re-Fill Lists 316 are FIFO lists used whenever a prescription cannot be filled by the associated filler 26. One Prescription Re-Fill List 316 is provided for each filler 26.

If it is determined, as discussed below, that a filler 26 cannot fill a prescription, the prescription is transferred from its associated Prescription Wait Queue 312 to this list until the filler 26 is restocked. Then, the prescription is reinserted in a Prescription Wait Queue 312 at the head of the list. The Prescription Filled Queues 318 are used after vials have passed their line scanners. One Prescription Wait Queue 312 is provided for each line scanner. When such is the case, a prescription is placed at the tail end of the Prescription Filled Queues 318. Each entry in a Prescription Filled Queue 318 is flagged to indicate the specific accumulation station 212 to which the associated vial is to be sent or if the vial is to be directed to the reject bin. Since the vials pass through the rotary indexes in a FIFO manner, this is a FIFO Queue.

The Prescription Sorted List 320 is used when a vial is about to be dropped into its assigned bin 220. Prescriptions are transferred to this list from the Prescription Sort Lists 310, as described below, when a determination is made to drop a vial into a bin 220. Prescriptions are deleted from this list after staging output processing.

The Patient Filled List 322 is used after an order of a patient has been filled. When such is the case, an order of the patient is removed from the Patient Filling List 306 and placed at the tail end of the Patient Filled List 322.

The Patient Filled List 322 is used by the mail order/-pickup delivery process to deliver a bin 220 to correct destination handling areas from the sorting conveyor 218. Once a bin 220 has been physically removed from the sorting conveyor 218, the order of a patient is then removed from the list 322.

For further information regarding the foregoing procedures, reference can be made to the aforementioned commonly assigned U.S. Pat. No. 5,208,762, issued May 4, 1993, the teachings of which are incorporated by reference.

It should be understood that various changes and modifications to the presently preferred embodiments described herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. An apparatus for staging drugs prior to dispensing into a container, comprising:
- means for receiving a drug falling under the influence of gravity and for storing the drug;
- a plurality of means for releasably retaining the drug, the plurality of means for releasably retaining within the means for receiving; and
- a plurality of means for releasing said plurality of means for releasably retaining and allowing the drug to again fall under the influence of gravity.

2. The apparatus of claim 1 wherein said means for receiving the drug falling under the influence of gravity and for storing the drug comprises a substantially funnel shaped enclosure having a top end that is open and a bottom end that has a closeable opening.

3. The apparatus of claim 1 wherein each of said plurality of means for releasably retaining the drug comprises a door.

4. The apparatus of claim 3 wherein said door is hingedly attached to said means for receiving the drug falling under the influence of gravity and storing the drug.

5. The apparatus of claim 1 wherein each of said plurality of means for releasing said plurality of means for releasably retaining comprises a piston and a solenoid assembly, the piston being operatively attached to each of the plurality of means for releasably retaining so as to move each of said plurality of means for releasably retaining between opened and closed positions.

6. The apparatus of claim 1 wherein each of the plurality of means for releasably retaining is biased to its closed position.

7. The apparatus of claim 1 comprising a plurality of means for receiving the drug falling under the influence of gravity and storing the drug.

* * * * *

UNITED STATES PATENT AND TRADEMARK OFFICE

CERTIFICATE OF CORRECTION

PATENT NO. : 5,348,061

DATED : Sept. 20, 1994

INVENTOR(S) : Riley et al.

It is certified that error appears in the above-indentified patent and that said Letters Patent is hereby corrected as shown below:

Column 2, line 19, replace "direction dispensing " with -- direct dispensing --.

Signed and Sealed this

Twenty-third Day of May, 1995

Attest:

Attesting Officer

BRUCE LEHMAN

*Commissioner of Patents and Trademarks*

US005348061B1

REEXAMINATION CERTIFICATE (3899th)

United States Patent [19]

[11] B1 5,348,061

[45] Certificate Issued Oct. 12, 1999

Riley et al.

[54] TABLET ACCUMULATOR FOR AN AUTOMATED PRESCRIPTION VIAL FILLING SYSTEM

[75] Inventors: Archie Riley, Athens, Ga.; Keith Goodale, Park City, Ill.

[73] Assignee: Baxter International Inc., Deerfield, Ill.

Reexamination Request:
No. 90/004,847, Nov. 25, 1997

Reexamination Certificate for:

| | |
|---|---|
| Patent No.: | **5,348,061** |
| Issued: | **Sep. 20, 1994** |
| Appl. No.: | **07/984,048** |
| Filed: | **Dec. 1, 1992** |

Certificate of Correction issued May 23, 1995.

[51] Int. Cl.$^{6}$ .................... G01G 19/00

[52] U.S. Cl. .................... 141/104; 141/98; 141/107; 141/83; 221/2; 221/129; 221/9; 221/133

[58] Field of Search .................... 221/2, 131, 5, 221/133, 9, 13, 129; 141/83, 102, 104, 105, 107, 98; 222/504; 251/62, 144, 303

[56] References Cited

U.S. PATENT DOCUMENTS

| | | | |
|---|---|---|---|
| 2,632,588 | 3/1953 | Hoar, Jr. . | |
| 4,226,343 | 10/1980 | Fling | 222/504 |
| 4,811,764 | 3/1989 | McLaughlin | 141/98 |

FOREIGN PATENT DOCUMENTS

| | | |
|---|---|---|
| 57-60962 | 12/1982 | Japan . |
| 59-152116 | 8/1984 | Japan . |

*Primary Examiner*—Steven O. Douglas

[57] ABSTRACT

A method and system for staging drugs dispensed from a drug dispensing apparatus including an accumulator operative to temporarily accumulate drugs for later dispensing into vials. The accumulator includes one or more staging containers positioned to receive dispensed drugs that fall freely under the influence of gravity, each container having an outlet that is selectively openable so that the drugs retained therein can be delivered to a vial at a later time. Several orders can be staged in parallel if several such staging containers are provided. The drugs are staged in the accumulators for dispensing before vials are positioned so that dispensing of all the drugs for each vial may be performed simultaneously.

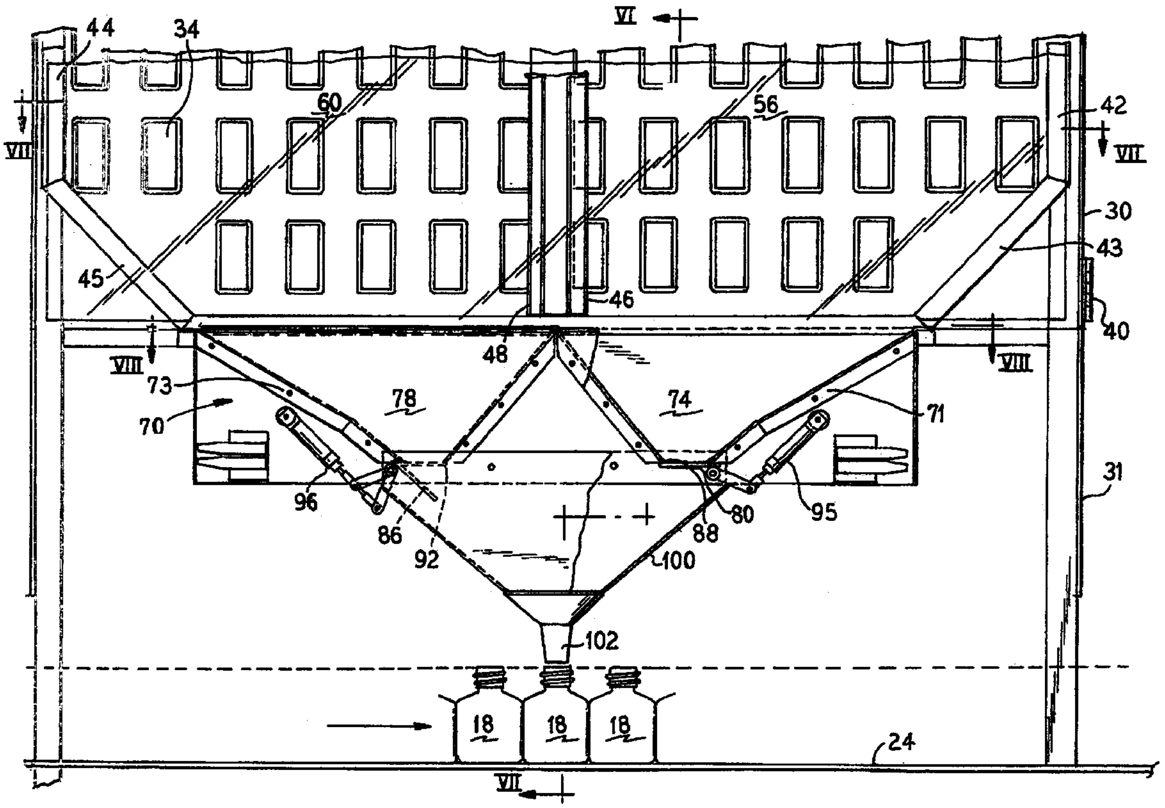

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–7 are determined to be patentable as amended.

New claims 8–30 are added and determined to be patentable.

1. An apparatus for staging drugs prior to dispensing into a container, comprising:

*drug-receiving* means for receiving a drug falling under the influence of gravity and for storing the drug;

a plurality of *retaining* means for releasably retaining the drug, the [plurality of] *retaining* means [for releasably retaining] *being* within the *drug receiving* means [for receiving]; [and]

a plurality of *releasing* means for releasing said plurality of *retaining* means [for releasably retaining] and allowing the drug to again fall under the influence of gravity, *the releasing means being positioned entirely outside of said drug receiving means*[.]*; and*

*control means for actuating the releasing means, the control means being entirely outside of said drug receiving means;*

*whereby, the drug falls without obstruction by the releasing means or control means.*

2. The apparatus of claim 1 wherein said *drug-receiving* means [for receiving the drug falling under the influence of gravity and for storing the drug] comprises a substantially funnel-shaped enclosure having a top end that is open and a bottom end that has a closeable opening.

3. The apparatus of claim 1 wherein each of said [plurality of] *retaining* means [for releasably retaining the drug] comprises a door.

4. The apparatus of claim 3 wherein said door is hingedly attached to said *drug-receiving* means [for receiving the drug falling under the influence of gravity and storing the drug].

5. The apparatus of claim 1 wherein each of said [plurality of] *releasing* means [for releasing said plurality of means for releasably retaining] comprises a piston and a solenoid assembly, the piston being operatively attached to each of the plurality of *retaining* means [for releasably retaining] so as to move each of said plurality of *retaining* means [for releasably retaining] between opened and closed positions.

6. The apparatus of claim 1 wherein each of the [plurality of] *retaining* means [for releasably retaining] is biased to its closed position.

7. The apparatus of claim 1 comprising a plurality of *drug-receiving* means [for receiving the drug falling under the influence of gravity and storing the drug].

*8. An apparatus for staging drugs prior to dispensing into a container, comprising;*

*a plurality of drug-receiving means for receiving a drug falling under the influence of gravity and for storing the drug;*

*a plurality of retaining means for releasably retaining the drug, the retaining means being within the drug-receiving means; and*

*a plurality of solenoid assemblies for releasing said plurality of retaining means and allowing the drug to again fall under the influence of gravity, the plurality of solenoid assemblies being entirely outside of said drug-receiving means; and*

*control means for actuating the solenoid assemblies, the control means being entirely outside of said drug receiving means;*

*whereby, the drug falls without obstruction by the solenoid assemblies or control means.*

*9. The apparatus of claim 8 wherein said solenoid assemblies each include a piston operatively attached to each of said plurality of retaining means so as to move each of said plurality of retaining means between opened and closed positions.*

*10. The apparatus of claim 8 wherein each of said retaining means is biased to its closed-position.*

*11. An apparatus for staging drugs prior to dispensing into a container, comprising:*

*a plurality of drug-receiving means for receiving drugs falling under the influence of gravity and for storing the drugs, each drug-receiving means including funnel-shaped walls defining top and bottom openings and a drug flow path therebetween in which drugs are received and through which they pass;*

*a plurality of retaining means in the drug flow path for releasably retaining the drugs, in the drug flow path, the retaining means being within the drug-receiving means and hingedly attached to a wall of the drug-receiving means;*

*a plurality of releasing means for releasing said plurality of retaining means and allowing the drug to again fall under the influence of gravity the releasing means being entirely outside of said drug flow path; and*

*a single means for receiving and directing the drugs falling under the influence of gravity from said retaining means;*

*whereby, the drugs falls without obstruction by the releasing means.*

*12. The apparatus of claim 11 wherein each of said releasing means comprises a piston and a solenoid assembly, the piston being operatively attached to a respective retaining means so as to move the respective retaining means between opened and closed positions.*

*13. The apparatus of claim 11 wherein each of the retaining means is biased to its closed position.*

*14. An apparatus for staging drugs prior to dispensing into a container, comprising:*

*a cabinet having a plurality of channels and a plurality of dispensing means for dispensing drugs into said plurality of channels;*

*a plurality of drug-receiving means for receiving drugs falling under the influence of gravity from said plurality of channels and for storing the drugs;*

*a plurality of retaining means for releasably retaining the drugs, the plurality of retaining means being within the drug-receiving means;*

*a plurality of releasing means for releasing said plurality of retaining means and allowing the drugs to again fall under the influence of gravity, the plurality of retaining means being entirely outside of said drug-receiving means; and*

*control means for actuating the plurality of releasing means, the control means being positioned entirely outside of said plurality of drug-receiving means;*

*whereby, the drug falls without obstruction by the releasing means and control means.*

*15. The apparatus of claim 14 wherein said plurality of dispensing means comprises a plurality of arrays of drug canisters each positioned to dispense drugs into a corresponding one of the plurality of channels.*

*16. The apparatus of claim 15 wherein said cabinet includes at least two of said arrays of canisters having dispensing ends that face each other within an interior of the cabinet.*

*17. The apparatus of claim 16 comprising four of said arrays of drug canisters positioned to dispense drugs into a corresponding four of said plurality of channels, said four of said plurality of channels being positioned to direct drugs falling under the influence of gravity into a corresponding four of said drug-receiving means from said plurality of channels and for storing that drug.*

*18. The apparatus of claim 17 wherein said four of said plurality of drug-receiving means are symmetrically positioned below said four of said plurality of channels.*

*19. The apparatus of claim 15 wherein said plurality of channels are positioned inwardly within said cabinet with respect to said plurality of arrays of drug canisters.*

*20. The apparatus of claim 19 wherein each of said drug canisters of said plurality of arrays of drug canisters includes a dispensing end facing inwardly within said cabinet to dispense drugs into said plurality of channels.*

*21. An apparatus for staging drugs prior to dispensing into a container, comprising:*

*a plurality of drug-receiving means for receiving a drug falling under the influence of gravity and for storing the drug, each drug-receiving means including funnel-shaped walls defining top and bottom openings and a drug flow path therebetween in which drugs are received and through which they pass;*

*a plurality of retaining means for releasably retaining the drugs in each of the drug-receiving means, each retaining means being within the drug-receiving means and having a first position in which the bottom opening is closed and at least one other position in which the bottom opening is open; and*

*a plurality of piston and solenoid assemblies positioned entirely outside of the drug flow path for releasing each of said retaining means, each piston being operatively attached to a respective retaining means so as to move each of said retaining means between the closed and opened positions;*

*whereby, a drug is retained in its respective drug-receiving means when the bottom opening is closed and falls under the influence of gravity, without obstruction by the plurality of piston and solenoid assemblies, when the bottom opening is open.*

*22. The apparatus of claim 21 wherein the each of said retaining means is a door hingedly attached to a corresponding funnel-shaped wall of the drug-receiving means.*

*23. The apparatus of claim 22 wherein each of the retaining means is biased to its closed position.*

*24. The apparatus of claim 22 further including control means for actuating the piston and solenoid assemblies, the control means being positioned entirely outside of said drug flow path.*

*25. The apparatus of claim 21 further including a cabinet having a plurality of channels and a plurality of dispensing means for dispensing drugs into said plurality of channels.*

*26. The apparatus of claim 25 wherein said cabinet includes at least two of said arrays of canisters having dispensing ends that face each other within an interior of the cabinet.*

*27. The apparatus of claim 26 comprising four of said arrays of drug canisters positioned to dispense drugs into a corresponding four of said plurality of channels, said four of said plurality of channels being positioned to direct drugs falling under the influence of gravity into a corresponding four of said plurality of means for receiving drugs from said plurality of channels and for storing that drug.*

*28. The apparatus of claim 27 wherein said four of said plurality of means for receiving drugs are symmetrically positioned below said four of said plurality of channels.*

*29. The apparatus of claim 26 wherein said plurality of channels are positioned inwardly within said cabinet with respect to said plurality of arrays of drug canisters.*

*30. The apparatus of claim 29 wherein each of said drug canisters of said plurality of arrays of drug canisters includes a dispensing end facing inwardly within said cabinet to dispense drugs into said plurality of channels.*

* * * * *